United States Patent [19]

Cawley et al.

[11] Patent Number: 4,855,834

[45] Date of Patent: Aug. 8, 1989

[54] VIDEO WIPE PROCESSING APPARATUS

[75] Inventors: Robin A. Cawley; Paul R. N. Keller, both of Newbury, United Kingdom

[73] Assignee: Quantel Limited, Newbury, Berkshire, England

[21] Appl. No.: 272,515

[22] Filed: Nov. 17, 1988

[30] Foreign Application Priority Data

Nov. 21, 1987 [GB] United Kingdom ................. 8727339

[51] Int. Cl.$^4$ ............................................. H04N 5/22
[52] U.S. Cl. ...................................... 358/183; 358/22
[58] Field of Search ........................... 358/22, 182, 183

[56] References Cited

U.S. PATENT DOCUMENTS

| | | | |
|---|---|---|---|
| 4,017,680 | 4/1977 | Anderson et al. | 358/183 X |
| 4,360,831 | 11/1982 | Kellar | 358/183 X |
| 4,395,733 | 7/1983 | Elenbaas | 358/183 |
| 4,602,286 | 7/1986 | Kellar et al. | 358/22 X |
| 4,667,221 | 5/1987 | Cawley et al. | 358/22 |
| 4,764,809 | 8/1988 | Haycock et al. | 358/183 |
| 4,805,022 | 2/1989 | Abt | 358/183 |
| 4,809,072 | 2/1989 | Pohl | 358/182 X |

*Primary Examiner*—Howard W. Britton
*Assistant Examiner*—Mark R. Powell
*Attorney, Agent, or Firm*—Cooper & Dunham

[57] ABSTRACT

A video processing system for generating an output sequence of video frames which, over time, a decreasing proportion of successive frames is derived from a first video input (21) and an increasing proportion of said frames is drived from a second input (22); an effect known as a wipe. A framestore (31) stores a frame of wipe-shape pixel signals wherein the value of each pixel represents the time at which the spacially corresponding output pixel is derived from the second video input signal. The wipe shape pixel signal are compared with a reference value, in response to which input signals are combined, and the reference value is adjusted between frames to create the wipe effect.

6 Claims, 3 Drawing Sheets

VIDEO WIPE PROCESSING APPARATUS

BACKGROUND OF THE INVENTION

The present invention relates to video processing apparatus of the type for producing a wipe wherein a decreasing area of successive output frames is derived from a first video signal and an increasing proportion of said area is derived from a second video input signal. The video effect known as a "wipe" consists of gradually removing a first image to reveal a second image; as if the first image were being rubbed off, or wiped from, the first image. Analogue systems for producing wipes are well known, for example, as shown in U.S. Pat. No. 3,371,160. The advent of operational amplifiers allowed analogue wipe techniques to be improved, for example, as shown in the article by Michael Cox published under the title "Electronic Effects" in the June 1982 edition of the British Kinematography Sound and Television Society Journal. Cox describes a system in which two video input signals (A and B) are combined by a control voltage C produced by a pattern generator. The instantaneous output is given by $AC + B(1-C)$ where C has a value between 0 and 1. The formation of the control signal is shown in which a sawtooth waveform is generated having a rise time equal to the duration of one TV line period. Manual potentiometers (referred to as faders) are then provided to adjust the position and size to a window over which C changes from 0 to 1. Similar means are then provided to generate a ramp equal to the frame period thus allowing wipes to be controlled in both the horizontal and vertical directions.

The disclosure states that it is possible to generate almost any imagenable pattern, using mixtures of analogue and digital circuit techniques. It can therefore be appreciated that such generation would not be performed by an operator but by a skilled electronic engineer. Thus the techniques could be employed when designing a machine but, once built, the operator would be presented with a collection of preset wipe shapes with the facility for creating new shapes.

It is an object of the invention to provide an improved system for wiping between video images. It is a further object of the invention to provide a versatiile system in which an operator may define the wipe shape. A further object of the invention is to provide a system for receiving two digitally encoded video signals to produce an output signal which wipes between the input signals.

SUMMARY OF THE INVENTION

According to the invention there is provided video processing apparatus for creating a wipe wherein a decreasing proportion of successive output frames is derived from a first video input signal (A) and an increasing proportion of said frames is derived from a second video input signal (B), characterized by frame storage means for storing a frame of multi-bit wipe-shape signals, addressing means for addressing said frame storage means in synchronism with the input video signals during frame periods, processing means for processing values read from said frame storage means with a reference signal to determine whether the output is to be derived from said first input, said second input or a combination of said inputs, and means for adjusting said reference signal between said frame periods.

Preferably the multi bit signals are created by a video graphics system such as, for example, the system disclosed in U.S. Pat. No. 4,602,286 (equivalent to U. Kingdom Patent No. 2 113 950). Referring to FIG. 2 of this patent, a control image 32 may be used to combine a first image 30 with a second image 31. However these images represent single frames and the composed image 34 does not vary over time. However the graphical techniques used for creating the control (or stencil) signal are also available for generating the wipe shape signal of the present invention. Thus, unlike previous systems, the operator may design a wipe shape by simply drawing luminance values using a stylus and touch tablet combination.

DESCRIPTION OF PREFERRED EMBODIMENTS

Figure 1:
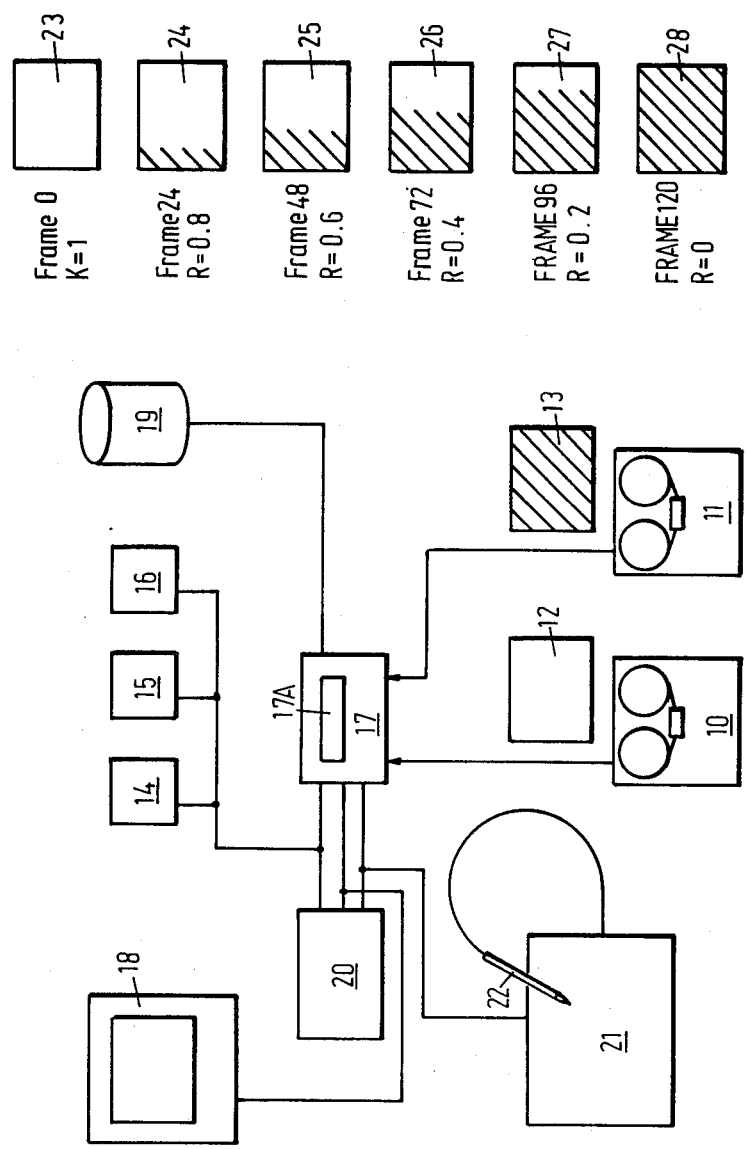
FIG. 1 shows a video processing system, including a keying processor for wiping between two video input signals and images of a wipe sequence.

A video processing system is shown in FIG. 1 arranged to create a wipe between a first video signal A, received from a VTR 10, and a second video signal B received from a VTR 11. Both video recorders 10, 11 are preferably digital machines generating video signals in component format and their outputs are suitably synchronised. Signals A and B are conventional moving images; and in the figure images from A are shown as blank white, reference 12, and images from B as diagonal lines, reference 13.

The system includes several framestores, three of which are shown referenced 14, 15, 16. Store 14 is arranged to receive a multi-bit (preferably 8 bit) wipe shape signal and an addressing circuit 17A, included in a keying processor 17, addresses the wipe shape store 14 in synchronism with the input video signals, from VTR's 10, 11 during frame periods. The keying processor 17 then processes values read from store 14 with an internally generated reference signal to determine, on a pixel by pixel basis, whether the output is to be derived from the first input A, the second input B or a combination of these inputs. The wipe is then effected by adjusting said reference signal by calculated increments between frame reading, i.e. during the blanking periods.

The resulting output may be viewed on a television type monitor 18, recorded on a third VTR or written to a real time disc 19. Disc based systems for real time video are also manufactured by the present Assignee and sold under the trade mark "HARRY" and described in U.S. Pat. No. 4,688,106, equivalent to British Patent No. 2 156 627.

In addition to showing the resulting output video image, monitor 18 may also be used to display the wipe shape. Furthermore the monitor 18 may be used interactively as part of a video graphics system including a graphics processor 19, a touch tablet 20 and a stylus 21. A video graphics system of this type is disclosed in U.S. Pat. Nos. 4,514,818 and 4,602,286 in which movement of a graphic implement, such as a brush, chalk or air brush, is simulated by moving the stylus 21 over the touch tablet 20. The stylus generates a signal indicating the pressure with which it is applied to the tablet which, in combination with its x, y position, is supplied to the graphics processor 19.

The generation of a wipe shape by means of the video graphics system is similar to creating a stencil signal, as described in U.S. Pat. No. 4,602,286. In this example, the wipe-shape signals consist of 8 bits for each pixel of the image which may be displayed as colour intensity values on monitor 18. A wipe is illustrated in FIG. 1 by images 23 to 28 which occurs over a time interval, defined by the operator, of say two seconds. The second image B is revealed from the left edge of the screen and a band, parallel to this edge, moves across to the right until image B occupies the whole of the screen. The band itself consists of an area in which signals from both images are combined thus giving a soft blend between the two images. When displayed on monitor 18, the wipe shape may be shown as being red at its left edge blending to white at its right edge; graduations of this type may be produced automatically by the video graphics system. Shapes may also be modified by manual use of the stylus synthesising, say, the operation of an air brush. As shown in FIG. 1, both the graphics processor 20 and the keying processor 17 have access to framestores 14 to 16. Alternatively separate framestores may be provided and data transferred between them over a fixed link or by means of a transportable medium such as a flexible disc.

Figure 2:
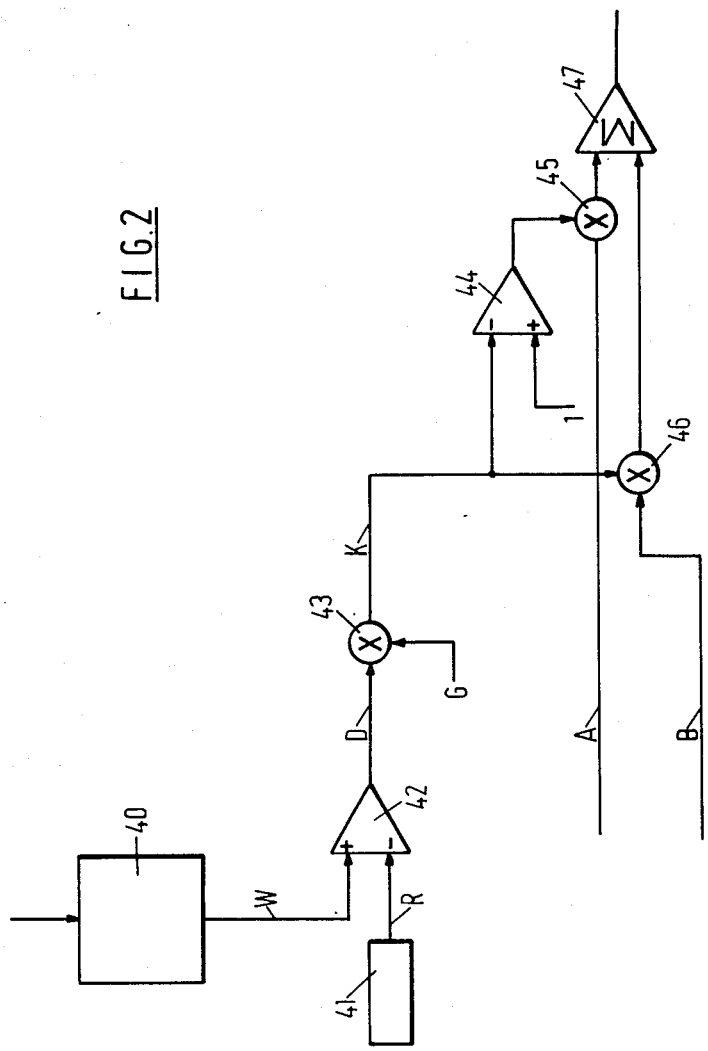
FIG. 2 details the keying processing unit shown in FIG. 1.

The keying processor 17 is detailed in FIG. 2 in which pixel values are read from framestore 14, in synchronism with the video input signals, to produce a keying signal k. The eight bit wipe shape signals from framestore 14 are supplied to a digital filter 40 arranged to produce ten bit wipe signals W by smoothing the 8 bit signals; all processing within the keying processor 17 is carried out using ten bits. A counter 41 generates a reference signal R which is substracted from values generated by filter 40, by a subtractor 42, to produce a difference signal D in which all values having a value less than zero are set to zero. The results are then supplied to a multiplier 43 which receives a preset gain value G as its second input to produce the keying signal k. The keying signal has a value between zero and unity and all results above unity are set to unity. A subtractor 44 produces a value 1−k, for each value of k, which is supplied to a multiplier 45 arranged to receive the first video input signal, from VTR10, as its second input. A multplier 46 receives the second video input signal, from VTR11, and the keying values k as its second input. The outputs from multipliers 45 and 46 are then combined by a summation circuit 47.

The counter 41 is programmed in response to commands from an operator representing the duration of the wipe, and hence the number of intermediate frames required during a wipe sequence. The maximum number of intermediate frames is determined by the number of bits being compared in subtractor 42 which, in this example, is set at ten bits. Once the number of intermediate frames has been selected, which in turn controls the duration of the wipe, then counter 41 is programmed to count down in suitable steps. Thus the arithmetic processes (performed by subtractors 42 and 44, and multipliers 43, 45 and 46) operate at video rate for each pixel signal - i.e. operation is in real time.

The width of the band in which the two images are combined is adjustable by the operator and results in adjustments to the value of G to supplied to multiplier 43. The value of the gain G and the width of the band are inversely related and in this example, have been set at a value of 10. The wipe sequency shown in FIG. 1 lasts for 2 seconds therefore wiping from image A to image B requires 120 frames; US NTSC standard. At the start of the sequence the reference value R is set to unity and during each blanking period it is reduced by 1/120 so that it is equal to zero by frame 120. The extent of the wipe is shown for frames 24, 48, 72 and 96 in FIG. 1 in which R is equal to 0.8, 0.6, 0.4 and 0.2 respectively.

If the processing is followed for any particular frame, say frame 48, it will be seen that R=0.6 which is substracted for all values of W. For all values of W less than 0.6 D is set to 0 and for values of W from 0.6 to 1 D has a value of 0 to 0.4. These values are multiplied by 10 to give a range 0 to 4 but all values above unity are set to unity. Thus for values of W between O and 0.6, k=0 and only image A is selected. For values of W between 0.7 and unity, k=1 and only image B is selected. However if W is greater than 0.6 and less than 0.7 k has an intermediate value and both images are combined in proportions determined by the value of k. For the next frame the value of k is reduced and the band of intermediate values moves to the right.

Additional effects may be introduced by modulating the reference signal produced by counter 41, for example the transition may appear to ripple.

Figure 3:
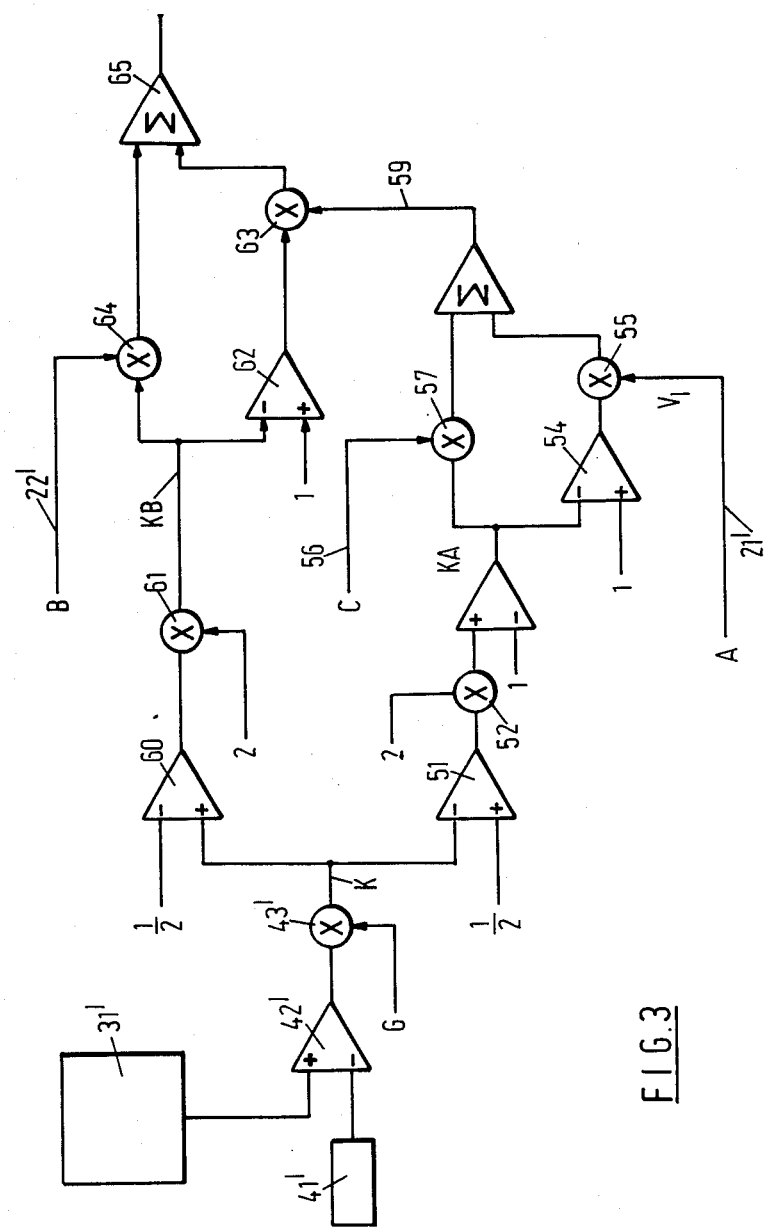
FIG. 3 details an alternative processing unit.

A further embodiment of the invention is shown in FIG. 3, wherein parts also shown in FIG. 2 are given the same reference followed by a prime, which is arranged to generate a colour band at the interface of the two video images. The unit is arranged two generate two keying signals, kA and kB, in which kA combines the first video signal A with a fixed colour signal to form a composite signal and kB combines the composite signal with the second video input signal B.

The output from multiplier 43′, formerly the keying signal k, is supplied to a subtractor 51 to form a signal k +½. This is then multiplied by 2 in multiplier 52 after which one is subtracted from the output of 52 in subtractor 53. However for all values above unity the output from 53 is set to unity therefore the output from 53, which forms keying signal kA, has a slope which is greater than that of k so that the maximum output, k =1, is reached sooner. A subtractor 54 forms 1-kA which is supplied to a multiplier 55 receiving the video signal A as its second input. The colour signal C is supplied on a line 56 to a multiplier 57 which receives kA as its second input. A summation circuit 58 combines the outputs from multipliers 55 and 57 to produce a composite signal on a line 59.

The signal k is also supplied to a subtractor 60 to produce k−½ which is multiplied by 2 in multiplier 61, however, all values below zero being set to zero to produce kB. Key signal kB is supplied to a subtractor 62 to produce 1−kB and this is supplied to a multiplier 63 which also receives the composite signal. The product of the second video signal and kB is formed in a multiplier 64 and the output from this multiplier and the output from multiplier 63 are combined in a summation circuit 65.

The invention may also be used for partial wipes in which the wipe sequence is stopped at a predetermined position, held and then returned to the original video source signal.

What we claim is:

1. Video processing apparatus for creating a wipe wherein a decreasing proportion of successive output frames is derived from a first video input signal (A) and an increasing proportion of said frame is derived from a second video input signal (B), characterised by frame storage means for storing a frame of multi-bit wipe-shape signals, addressing means for addressing said frame storage means in synchronism with the input video signals during frame periods, processing means for processing values read from said frame storage with a reference signal to determine whether the output is to be derived from said first input, said second input or a combination of said inputs, and means for adjusting said reference signal between said frame periods.

2. Video processing apparatus according to claim 1 characterised in that said frame of wipe shape signals is generated by a video graphics system.

3. Video processing apparatus according to claim 2 characterised in that said video graphics system includes manually operable means in the form of a stylus and a touch tablet.

4. Video processing apparatus according to claim 1 characterised in that said processing means includes means for producing a difference value between values read from said framestore and said reference signal.

5. Video processing apparatus according to claim 4 characterised in that said processing means includes means for multiplying said difference value.

6. Video processing apparatus according to claim 4 or claim 5 wherein the results of processing said signals are set to zero if a result is produced below zero and set to unity if a result is produced above unity.

* * * * *